June 13, 1939.  K. A. BROWNE  2,162,243
AUTOMATIC MAGNETO COUPLING
Filed Sept. 7, 1935
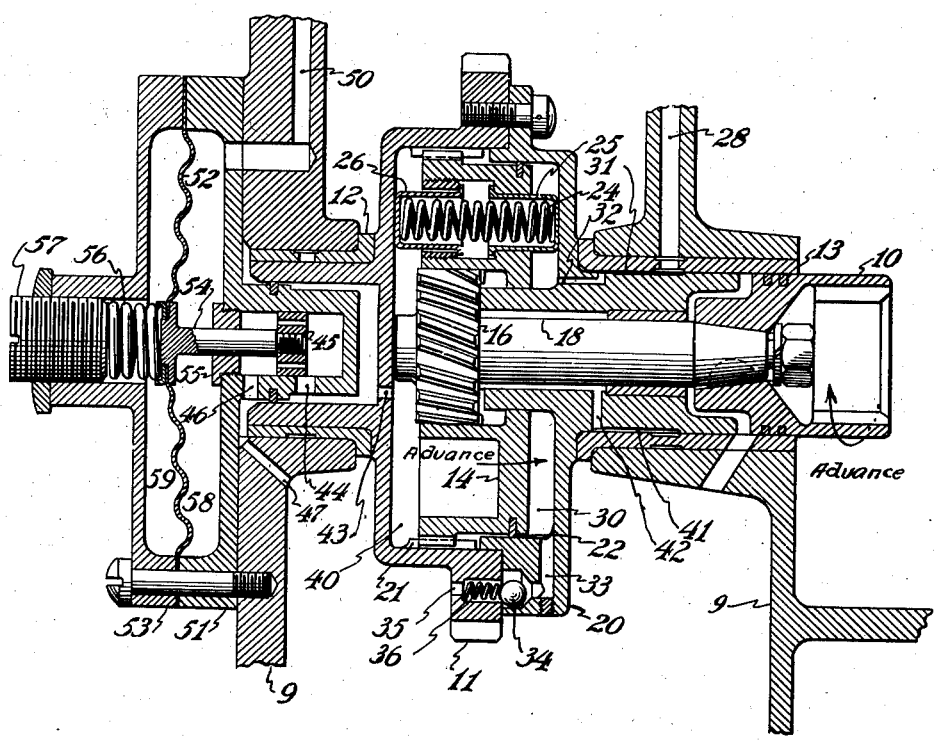
Fig.1.
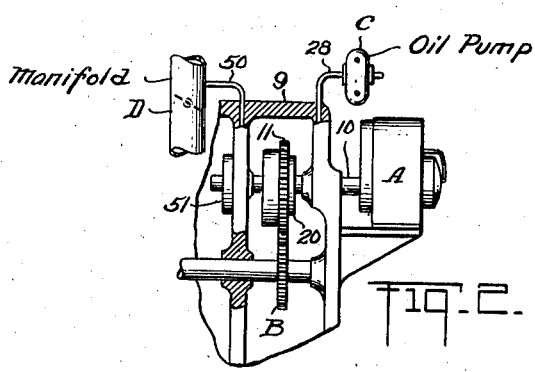
Fig.2.
INVENTOR.
Kenneth A. Browne.
BY
ATTORNEY.

Patented June 13, 1939

2,162,243

UNITED STATES PATENT OFFICE 2,162,243

AUTOMATIC MAGNETO COUPLING

Kenneth A. Browne, Saddle River, N. J., assignor to Wright Aeronautical Corporation, a corporation of New York Application September 7, 1935, Serial No. 39,619

13 Claims. (Cl. 123—117)

My invention relates to variable ignition timing drives for internal combustion engines in general and to automatic spark advance drives for aircraft engine magnetos in particular.

From a study of the spark advance requirements of an aircraft engine the following timings are, in general, desirable:

(1) For full power, the minimum advance consistent with power output which effectively suppresses detonation in the combustion of the fuel in use and prevents excessive cylinder temperatures, usually 15° to 25° before top center;

(2) For cruising power, the maximum advance consistent with power output which produces the minimum fuel consumption, usually 30° to 40° before top center;

(3) For idling conditions, the minimum advance which will cause regular firing of the cylinder charge, usually 0° to 10° before top center. In many cases the only means available to reduce aircraft engine idling speed to usable figures is a retardation of the spark timing; and (4) For starting or cranking conditions, the maximum advance which does not cause kickback with the starter used, usually 15° to 25° before top center.

It is an object of my invention to accomplish any or all of the above desirable spark timing conditions automatically. A further object is to provide manifold pressure-responsive means for automatically adjusting the spark advance. Still another object is to provide a mechanism utilizing engine oil pressure for changing the spark advance, the oil flow being controlled by a manifold pressure-responsive diaphragm.

Further objects will become apparent in reading the following detailed description, and in viewing the drawing, in which:

Fig 1 is a view in section through the preferred embodiment of the invention as applied to a magneto drive. The timing mechanism is shown in the position for the full power timing which henceforth will be designated as normal advance; and Fig. 2 is a fragmentary diagrammatic view of part of an engine showing the disposition of the invention therein.

Referring to the drawing, 9 designates part of the engine casing in which is journaled a magneto drive coupling 10, from which the spark ignition magneto A or, alternatively, a timer and distributor, is driven. A gear 11 supported in suitable bearings 12 and 13 in the casing 9 is driven from a suitable engine gear B and transmits its rotation to the magneto coupling 10 through an oil pressure operated timing piston 14 to a helically splined hub 16, engaging complementary splines in the piston 14, the oil pressure being derived from an engine driven pump such as C. The hub 16 is integral with a shaft 18 on which is secured the magneto coupling 10. The timing piston 14 is slidably fitted in an oil cylinder 20 secured to the gear 11 and is oil sealed by a piston ring 22, and is also positively meshed for turning with the gear 11 by straight splines at 21. It is thus seen that axial shifting of the piston 14 produces a relative angular shift between the gear 11 and the magneto coupling 10, through the helically splined hub 16, the rate of shift being dependent upon the lead of the helical spline of the hub 16. The hand of the splines is arranged to advance the coupling rotationally when the piston 14 is moved toward the coupling, and to retard the coupling when the piston is moved away from the coupling, the latter retarded position corresponding to about 0° to 10° spark occurrence ahead of top dead center of the firing engine cylinders.

The magneto, rotated by the coupling 10, upon rotation of the gear 11, is arranged to deliver sparks to the engine in timed sequence in the well known manner. The rotational shift between elements 10 and 11, while both are rotating, effects the necessary retard or advance of the spark timing.

The piston 14 is restrained in the mid-position shown in Fig. 1, corresponding to moderate spark advance by initial tension in springs 24 acting through the slidably fitted spring cups 25 and 26, and is moved from the mid-position by a difference in oil pressure between chambers 30 and 40 on either side of the piston, these chambers being formed within the space bounded by the cylinder 20 and the hub of the gear 11. Both chambers 30, 40 are continuously supplied with a small quantity of oil from the oil pump C, from a passage 28 communicating with the engine oil pressure, through shaft flats 31, 41, on the journals of the cylinder 20, and oil passages 32, 42, respectively. Oil in the chamber 30 is drained through a passage 33, by a ball valve 34 and out through a hole 35. A spring 36 placed behind the ball 34, is so designed that its force on the ball valve 34 is sufficient to build up pressure in the chamber 30 when the rotational speed of the drive is slow as at idle speed of the engine, but is not sufficient to hold the ball valve 34 on its seat at high speed due to the centrifugal force acting on the ball 34. Oil in the chamber 40 is drained through holes 43, 44, by the piston valve 45 and out through holes 46, 47, said piston valve having small orifices therein to permit of oil relief from the right side thereof as shown.

Housings 51, 53 carrying an elastic diaphragm 52, clamped between them, and a chamber 58 on one side of the diaphragm communicates, via the passage 50, with the engine manifold D. A chamber 59 on the opposite side of the diaphragm is closed. Tension on the diaphragm 52 is adjusted by a spring 56 and a screw 57. The diaphragm 52 connects to the piston valve 45 by a rod 54 slidably fitted in a sealing bushing 55.

The operation of the device is as follows:

On starting, there is no engine oil pressure, therefore the spark advance is normal as shown in Fig. 1, due to the spring 24 acting to locate the piston 14 centrally. As soon as the engine starts, oil pressure is built up and, with a closed throttle, the diaphragm 52 is moved to the right, due to the low manifold pressure. This causes the piston 45 to uncover the oil passage 44, allowing the chamber 40 to drain off pressure oil. The chamber 30 fills with oil, and as pressure is built up, forces the piston 14 to its extreme leftward position. The ball valve 34 is seated on the oil passage 33, due to low idling speed. This condition gives full retard on the magneto by shifting the drive relationship of the gear 11 to the coupling 10 through the helical spline of the hub 16. As the engine throttle is opened the engine speed picks up, causing the ball valve 34 to be thrown from its seat by centrifugal force, therefore relieving the pressure in the chamber 30. The springs 24 return the piston to center as shown in Fig. 1, thus producing normal spark advance as when the engine is not operating. As the engine is further speeded up into the cruising power range, the increasing manifold pressure causes the diaphragm 52 to assume the balanced position where the piston valve 45 closes the oil drain 44 causing oil pressure to build up in the chamber 40, to force the piston 14 to the extreme right position, thus obtaining full advance for the cruising power condition by the shifting of the piston 14 along the helically splined hub 16. As the engine throttle is further opened into the full power position, the further increase in manifold pressure encountered moves the diaphragm 52 to the extreme left position shown in Fig. 1, thus again opening the oil hole 44 and relieving the oil pressure from the chamber 40, thus allowing the piston 14 to return to center, as shown in Fig. 1, and resulting in normal spark advance for full power operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with an engine subject to varying manifold pressure, of a drive coupling including means responsive to hydraulic pressure to rotationally advance said coupling, and means responsive to manifold pressure to regulate said hydraulic pressure.

2. The combination with an engine subject to varying manifold pressure, of a rotationally advanceable coupling actuated by hydraulic pressure, and hydraulic pressure regulating means responsive to manifold pressure and centrifugal force.

3. The combination with an engine subject to varying manifold pressure and having an oil pressure system, of an automatic advance coupling including a piston operable by oil pressure, and means to vary the operating oil pressure responsively to centrifugal force and manifold pressure.

4. The combination with an engine subject to varying manifold pressure, of an automatic advance coupling including a piston having helical splines, a shaft member engaged by said splines, means to apply hydraulic pressure to both sides of said piston, means responsive to centrifugal force to vent the pressure from one piston side, and means responsive to manifold pressure to vent the pressure from the other piston side.

5. The combination with an engine subject to varying manifold pressure, of a coupling including a piston hydraulically movable to advance and retard the coupling, and pressure relief valves connected to respective sides of said piston and responsive respectively, to manifold pressure and centrifugal force.

6. In an ignition timing drive for an engine, a member having a chamber, a piston axially movable therein defining spaces on either side thereof, a source of fluid pressure communicating with said chamber, means responsive to rotation of said member for bleeding fluid from one side of said piston, means responsive to engine speed and throttle opening for bleeding fluid from the other side of said piston, whereby fluid pressure differentials occur between the sides of said piston during engine operation to effect axial movement of said piston, a rotationally advanceable drive coupling for the ignition timing, and means for advancing and retarding said coupling in response to axial movement of said piston.

7. In an engine having a manifold subject to pressure changes, a hollow member having a movable partition therein subject on both sides to pressure, means for adjusting the pressure on one side of the partition in proportion to the manifold pressure, means for adjusting the pressure on the other side of said partition in response to engine speed, whereby movements of said partition take place during changes in the engine operation, a rotationally adjustable timing drive element, and means for adjusting said element in response to movement of said partition.

8. The combination with an engine adapted to vary in speed, of a rotationally advanceable coupling actuated by hydraulic pressure, and hydraulic pressure regulating means responsive to engine speed variations.

9. The combination with an engine adapted to vary in speed and having an oil pressure system, of an automatic advance coupling including a piston operable by oil pressure to advance the coupling, and means responsive to engine speed variations to control the oil pressure.

10. The combination with an engine adapted to vary in speed and having an oil pressure system, of an automatic advance coupling including a piston operable by oil pressure to advance the coupling, and means to vary the oil pressure on said piston in response to centrifugal force developed as a result of engine speed.

11. The combination with an engine subject to varying manifold pressure and having an oil pressure system, of an automatic advance coupling including a piston operable by oil pressure, and means to vary the operating oil pressure in response to variations in manifold pressure.

12. In an engine, an element rotatably driven thereby, a second element driven by said first element and rotatable with and with respect thereto, power means for rotating said elements independently of the engine with respect to each other, and means responsive to engine rotational speed for directly controlling said power means.

13. In a timing drive for an engine, a cylinder having an axially movable piston therein subject to and movable by fluid pressure difference on opposite sides thereof, means for controlling the fluid pressure on one side of said piston in accordance with engine manifold pressure, means for controlling the fluid pressure on the other side of said piston in accordance with engine speed, a rotationally adjustable timing drive element, and means for adjusting said element in response to axial movement of said piston.

KENNETH A. BROWNE.